2,776,989
PROCESS OF PREPARING α-DICHLOROMETHYL BENZHYDROL ESTERS

W E Craig and Elwood Y. Shropshire, Philadelphia, Pa., and Harold F. Wilson, Moorestown, N. J., assignors to Rohm & Haas Company, Philadelphia, Pa., a corporation of Delaware No Drawing. Application March 8, 1954, Serial No. 414,903

8 Claims. (Cl. 260—487)

This invention concerns a process for preparing esters of the structure

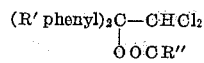

wherein R' is hydrogen, fluorine, chlorine, bromine, lower alkyl (methyl to butyl), or lower alkoxy, and R" is hydrogen, an alkyl group of not over three carbon atoms, or a chloroalkyl group of not over three carbon atoms. This process comprises reacting together a compound $(R' \text{ phenyl})_2\text{CClCHCl}_2$ and a salt

MOOCR"

under acidic conditions, as in the presence of the free acid HOOCR" or of its anhydride, R" having the same significance as above.

Although the chlorine atoms of the starting bischlorophenyltrichloroethane are inactive as shown by failure to react with silver ions, the single chlorine on the carbon atom carrying the phenyl groups can be replaced with formation of an ester and of a salt. The reaction should be carried out at a pH below 7, best at a pH between 2 and 6.

A diphenyltrichloroethane is mixed with free acid, preferably the acid (or its anhydride) corresponding to the salt to be reacted therewith, and this acid mixture and the salt of a defined monocarboxylic acid are reacted, usually by heating between 50° and 150° C. The presence of an inert organic solvent is usually helpful, such as naphtha, benzene, toluene, xylene, ethylene dichloride, etc. Formic acid or acetic acid also serve as good solvents. It is generally most convenient to heat a mixture containing solvent under reflux. The reaction mixture is filtered to remove salt and then worked up. In one way of proceeding solvent and free acid are stripped off. The product, obtained as a residue, can be used in this form or it can be recrystallized, as from petroleum ether or nitromethane. It is sometimes convenient to wash the filtered solution with water. If the ester is formed from formic acid, washing should be done in the cold to avoid hydrolysis.

Typical diphenyltrichloroethanes which can be used are 1,1-bis(chlorophenyl)-1,2,2-trichloroethane, 1,1-bis-(bromophenyl) - 1,2,2 - trichloroethane, 1,1 - bis(fluorophenyl) - 1,2,2 - trichloroethane, 1,1-bis(methylphenyl)-1,2,2-trichloroethane, 1,1-bis(ethylphenyl) -1,2,2 -trichloroethane, 1,1-bis(butylphenyl)-1,2,2 - trichloroethane, or 1,1 - bis(methoxyphenyl)-1,2,2-trichloroethane. Similar bromoethanes can be used. The above compounds are available as is known, by starting from 1,1-bisphenyl-2,2-dihaloethanes, dehydrohalogenating a said compound to give a 1,1-bisphenyl-2-haloethylene, and adding halogen thereto.

Typical bisphenyldihaloethanes which can be considered as source materials include bis(4-chlorophenyl)-, bis(4-bromophenyl)-, bis(4-fluorophenyl)-, bis(dichlorophenyl)-, bis(methylchlorophenyl)-, ditolyl, bis(ethylphenyl)-, bis(butylphenyl)-, bis(methoxyphenyl)-, etc. 2,2-dichloroethanes. There may be used a single isomer or a mixture of isomers.

Dehydrohalogenation of these compounds is accomplished by treating them with sodium or potassium hydroxide in the presence of an alcohol, such as methyl, ethyl, propyl, or butyl alcohol, at 60° to 125° C. Excess alkali and salt formed are washed away with water and the ethylenic derivatives are obtained upon stripping.

The ethylenic derivatives are converted to the trichloro compounds by adding chlorine. This may be done in bulk or in solution. As solvents there may be used carbon tetrachloride, ethylene dichloride, tert-butyl alcohol, acetic acid, or similar organic solvent. Chlorine is passed in at 20° to 75° C. until about the theoretical amount has been taken up. The reaction mixture is washed with water, solvent is removed, if used, and the product of the formula

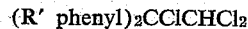

is separated.

As salts, there may be used various salts of formic, acetic, propionic, or butyric acid or the chloroacetic, chcloropropionic, or chlorobutyric acids. The sodium or potassium salts are most convenient, but useful salts are not limited thereto, as silver, copper, zinc, calcium, barium, and ferric salts, and the like may be used. The substituent M in the above formula may thus be a metal cation.

Typical preparations are described with additional details in the following illustrative examples, wherein parts are by weight.

Example 1

A mixture of 1,1-bis(4-chlorophenyl)-1,2,2-trichloroethane and 14.08 parts of sodium acetate in 210 parts of acetic acid and 32.5 parts of acetic anhydride was heated under reflux for eight hours. Acetic acid and anhydride were distilled off. The residue was taken up in ethylene dichloride and the solution was washed with water. Solvent was distilled off to yield an oily residue, which was crystallized from petroleum to give a white solid which melted at 118°–122° C. and corresponded in analysis to α-dichloromethyl-4,4'-dichlorobenzhydryl acetate.

In place of 1,1-bis(chlorophenyl)-1,2,2-trichloroethane there may be used in the same way any of the above compounds with the various phenyl substituents. In each case there results the corresponding acetate.

Example 2

There were mixed 61 parts of 1,1-bis(4-chlorophenyl)-1,2,2-trichloroethane, 20 parts of sodium chloroacetate, 5 parts of acetic anhydride, and 200 parts of naphtha.

The mixture was heated under reflux for ten hours and then distilled to give an oily residue. This was taken up in ethylene dichloride, filtered, and washed with water. The solvent was distilled off and the product distilled at 175°–183° C./0.3 mm. It corresponds in composition to α-dichloromethyl-4,4'-dichlorobenzhydryl chloroacetate.

Other substituents may be present in the phenyl nuclei than chlorine without any change in the above process. In each case there is obtained the corresponding chloroacetate. In place of sodium chloroacetate there may be used other salts of chloroacetic acid with similar end results. Likewise, other chlorinated carboxylates can be so used.

Example 3

A mixture of 88 parts of 1,1-bis(4-chlorophenyl)-1,2,2-trichloroethane, 240 parts of 98% formic acid, 30 parts of sodium formate, and 165 parts of xylene was heated under reflux for about 16 hours. The reaction mixture was twice washed with water. The solvent solution was heated with distillation of solvent. The reaction product was distilled at 158°–162° C./0.3 mm. The distillate solidified and had a melting point of 104°–106° C. It corresponded in composition to α-dichloromethyl-4,4'-dichlorobenzhydryl formate.

In place of the chlorophenyl compound, there may be used as a starting material the diphenyl-, bis(fluorophenyl)-, bis(bromophenyl)-, bis(methoxyphenyl)-, bis(ethoxyphenyl)-, bis(ethylphenyl)-, bis(butylphenyl)-, or bis(methylchlorophenyl)- compounds. In each case a formate results.

In the same way other esters can be prepared from other carboxylates.

The esters of this invention are effective pesticidal agents, being effective for controlling mites on plants. They may be used in dusts or aqueous dispersions of wettable powders or of emulsions. Evaluation tests have shown kill of adult two-spotted mites and of their eggs as follows at dilutions of 1:800: α-dichloromethyl-4,4'-dichlorobenzhydryl butyrate, 51% and 19% respectively; α-dichloromethyl-4,4'-dichlorobenzhydryl acetate, 92% and 15%; α-dichloromethyl-4,4'-dichlorobenzhydryl chloroacetate, 53% and 23%; α-dichloromethyl-4,4'-diethylbenzhydryl formate 89% and 15%; α-dichloromethyl-4,4'-dichlorobenzhydryl formate, 100% and 100%; α-dichloromethylbenzhydryl acetate, 85% and 11%; α-dichloromethylbenzhydryl formate, 90% and 20%, etc.

Any one of these compounds may be used as the sole toxicant in a spray or dust for application to plants infested with mites, spiders, or other acarids. They may also be used in conjunction with insecticides and/or fungicides in multi-purpose dusts or sprays.

We claim:

1. A process for preparing esters of the structure

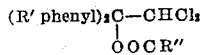

which comprises reacting by heating together in an acidic environment between 50° and 150° C. a compound of the formula

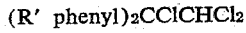

and a salt of the formula

MOOCR''

R' being a member of the class consisting of hydrogen, fluorine, chlorine, bromine, alkyl groups of not over four carbon atoms, and the methoxy group, R'' being a member of the class consisting of hydrogen, alkyl groups of not over three carbon atoms, and chloroalkyl groups of not over three carbon atoms, and M being a metal cation forming a salt with the acid HOOCR'' and forming a metal chloride.

2. A process for preparing esters of the structure

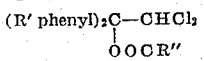

which comprises reacting in an inert organic solvent in an acidic environment by heating between 50° and 150° C. a compound of the formula

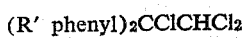

and a salt of the formula

MOOCR''

R' being a member of the class consisting of hydrogen, fluorine, chlorine, bromine, alkyl groups of not over four carbon atoms, and the methoxy group, R'' being a member of the class consisting of hydrogen, alkyl groups of not over three carbon atoms, and chloroalkyl groups of not over three carbon atoms, and M being a metal cation forming a salt with the acid HOOCR'' and forming a metal chloride.

3. A process for preparing an ester of the formula

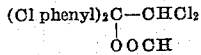

which comprises reacting together in the presence of formic acid by heating between 50° and 150° C. a compound of the formula

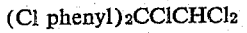

and a salt of the formula

MOOCH where M is an alkali metal cation forming a salt with formic acid.

4. A process according to claim 3 wherein M is sodium.

5. A process for preparing an ester of the formula

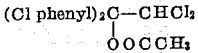

which comprises reacting in the presence of acetic acid by heating between 50° and 150° C. a compound of the formula

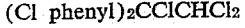

and a salt of the formula

MOOCCH₃ wherein M is an alkali metal cation.

6. A process according to claim 5 wherein M is sodium.

7. A process for preparing an ester of the formula

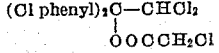

which comprises reacting in an inert organic solvent under acidic conditions by heating between 50° and 150° C. a compound of the formula

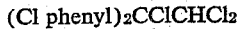

and an alkali metal salt of chloroacetic acid.

8. The process of claim 7 wherein the salt is the sodium salt.

References Cited in the file of this patent

UNITED STATES PATENTS 2,500,009   Saunders _____ Mar. 7, 1950
2,530,653   De Benneville _____ Nov. 21, 1950

OTHER REFERENCES

Hammett: "Physical Organic Chemistry," pp. 167–9, McGraw-Hill Book Co., Inc., 1940.

March et al.: J. Econ. Entomol., vol. 45 (1952), pp. 851–3.